April 7, 1970  D. S. BLISS ET AL  3,504,755

GAS-CUSHION VEHICLES

Filed July 18, 1968  3 Sheets-Sheet 1

Patented Apr. 7, 1970

3,504,755
GAS-CUSHION VEHICLES
Denys Stanley Bliss and Christopher Sydney Cockerell, Southampton, England, assignors to Hovercraft Development Limited, London, England, a British company
Filed July 18, 1968, Ser. No. 745,760
Claims priority, application Great Britain, July 19, 1967, 33,257/67
Int. Cl. B60v 1/16
U.S. Cl. 180—118                          14 Claims

ABSTRACT OF THE DISCLOSURE

A gas-cushion vehicle in which the supporting cushion is contained by successive flexible walls. The innermost flexible wall is of greater depth than the next wall and if the innermost wall drags on the surface over which the craft is travelling an additional cushion is formed between the two flexible walls. This may be effected manually or automatically in response to wall movements.

---

The present invention relates to gas cushion vehicles, that is to say, to vehicles for travelling over a surface and which, in operation, are supported above the surface, at least in part, by a cushion of pressurised air formed and contained in a space (the cushion space) beneath the vehicle body.

British Patent No. 1,043,351 describes and claims gas-cushion vehicles wherein the vehicle-supporting gas cushion is contained, at least in part, by a flexible wall or skirt comprising a succession of independently deflectable flexible wall members each having an outer portion which extends away from the vehicle body and which faces the cushion space and a pair of side portions which extend inwardly from said outer portion towards said space, a side portion of each wall member being contiguous with the adjacent side portion of a neighbouring wall member, and constraining means for constraining the wall members against deflection away from said space by the pressure of gas therein, whereby inflation of said wall members by pressurised gas, which may be from said space, urges the contiguous side portions of neighbouring wall members towards each other.

In operation, contact between a flexible wall and the surface beneath the vehicle carrying it will set up a frictional drag force which has a horizontal component whose line of action is below the level of the centre of gravity of the vehicle. Accordingly, the drag force has a moment which tends to tilt the vehicle in a vertical plane about the centre of gravity in the same sense as the moment. Thus, if contact between the flexible wall and the surface takes place at the front of the vehicle while the vehicle is moving forwards, the drag force acts rearwardly on the bottom of the front portion of the wall and the moment of the force tends to tilt the vehicle into a nose-down attitude. If contact between the flexible wall and the surface occurs elsewhere on the vehicle, for example, if the vehicle is tilted and driven to one side by side winds, the drag forces thus set up would tend to tilt the vehicle downwardly towards the region of wall-to-surface contact.

The tilt of the vehicle arising from the drag forces tends to increase the degree of contact between the wall and the surface and any increase in the degree of wall-to-surface contact in its turn brings about an increase in the drag force and a consequent increase in the degree of tilt of the vehicle. One circumstance in which the vehicle's attitude may be disturbed by contact between the wall and the surface arises when the surface over which the vehicle is travelling has a gradient which increases so rapidly that the vehicle cannot make pitch accommodations for it. The front portion of the flexible wall may then be crumpled and pulled under the vehicle body by drag against the surface. For instance, during travel over water, the vehicle might encounter the upward gradient leading to the crest of a wave whilst in a pitch attitude suited to negotiating the trough of the wave. The flexible wall then contacts the water surface whereby the consequent drag force on the front of the vehicle tilts the vehicle downwardly at the front. In severe instances, the drag force at the front of the vehicle may so tilt the vehicle downwardly relative to the surface that there is a risk of the vehicle somersaulting about its front end.

In certain situations, contact between the flexible wall and the surface sets up a drag force which tends to displace the centre of pressure of the vehicle-supporting cushion in the direction of relative motion of the surface. For example, if the flexible wall at the front and rear of the vehicle is displaced rearwardly while the vehicle is moving forwards, the front and rear ends of the cushion will also be displaced rearwardly and the effect will be to bring about a rearward displacement of the centre of pressure of the cushion. Such a rearward displacement will tend to tilt the vehicle into a nose-down attitude, thus possibly aggravating the effects of drag on the skirt.

According to the present invention, the vehicle-supporting cushion of a gas-cushion vehicle is contained, at least in part, by a flexible wall comprising a succession of independently deflectable flexible wall members each having an outer portion which extends away from the vehicle body and which faces the cushion space and a pair of side portions which extend inwardly from said outer portion towards said space, a side portion of each wall member being contiguous with the adjacent side portion of a neighbouring wall member, and means for constraining the wall members against deflection away from said space by the pressure of gas therein, whereby inflation of said wall members by pressurised gas urges the contiguous side portions of neighbouring wall members towards each other, the vehicle being provided with a second flexible wall said second wall being disposed outwardly of the first wall whereby the side portions of the wall members of the first wall are embraced by the side portions of the wall members of the second wall, the first wall normally projecting further below the vehicle body than the second wall, and means operable when the projecting portion of the first wall is deflected inwardly by contact with the surface beneath the vehicle to release pressurised gas between adjacent parts of the first and second walls whereby a region of pressurised gas is formed therebetween.

Preferably the second flexible wall is of the same form as the first flexible wall. The region of pressurised gas may be used to provide an extension of the vehicle-supporting gas-cushion whereby the centre of pressure of the cushion is displaced outwardly. It may also be used to further deflect the first wall structure so that the latter is moved away from the surface beneath the vehicle.

The means to release the pressurised gas may take the form of one or more valves which may be operated automatically as a result of the first wall being deflected inwardly by contact with the surface.

Alternatively the valves may be operated manually, for example under the control of the pilot.

For automatic operation the valves may take the form of apertures in the first flexible wall which are normally closed by contact with the second flexible wall but will open when the flexible walls are separated to allow a flow of pressurised gas to the space between the flexible walls.

The flexible walls may be interconnected in such a manner that they are held in sealing relationship until the inner wall drags on the surface when the movement of the inner wall will be conveyed to the outer wall to produce the separation.

The walls may be interconnected by a cord and pulley arrangement, for example.

Alternatively the valves may be separate from the walls and may be operated by mechanical means.

For example the valves may be operated by a sensing device which is moved by contact with said surface.

The sensing device may be a simple probe resiliently urged towards said surface so that contact with the surface causes upward movement of the probe and operates the valves.

Alternatively the valve may be directly connected by mechanical means, such as a cord, to the inner wall so that upward movement of the inner wall operates the valve. The mechanical means may be a spring biassed drum round which a cord is wound so that if the cord slackens due to upward movement of the inner wall the drum rotates under spring pressure to operate the valves.

Finally there may be a third flexible wall outside the second wall to provide yet another cushion in the event that the second wall contacts the surface, the second wall normally projecting further below the body of the vehicle than the third wall.

An embodiment of the invention will now be described by way of example with reference to the accompanying drawings wherein.

Figure 1:
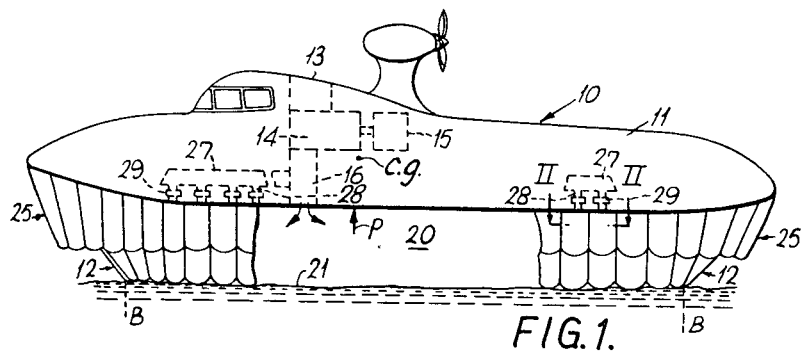
FIGURE 1 is a side view of a gas-cushion vehicle.
Figure 3:
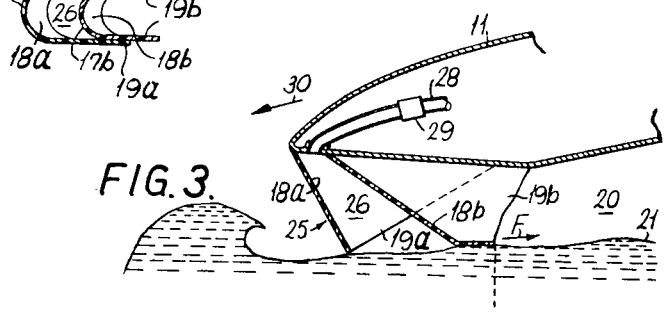
Figure 4:
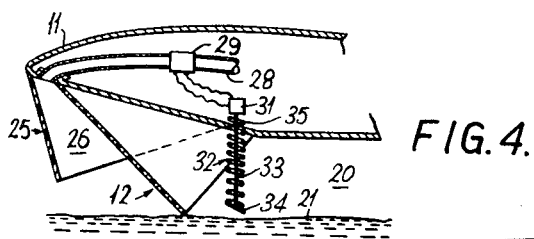
Figure 5:
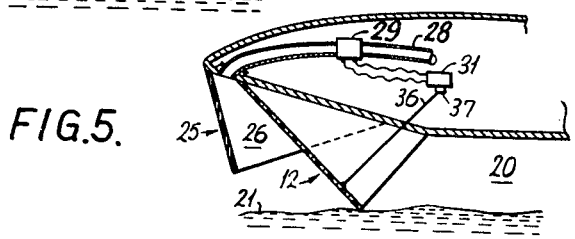
Figure 6:
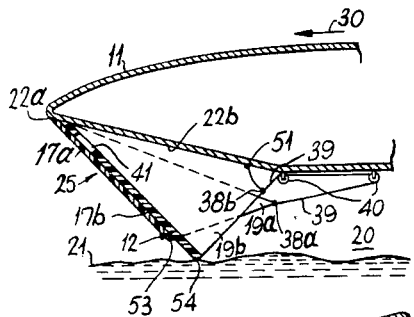
Figure 7:
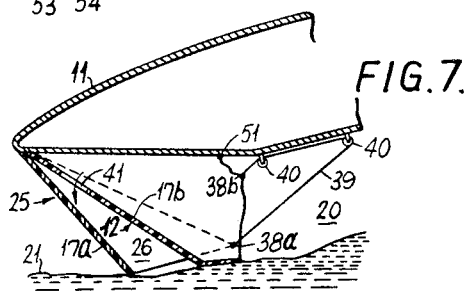
Figure 8:
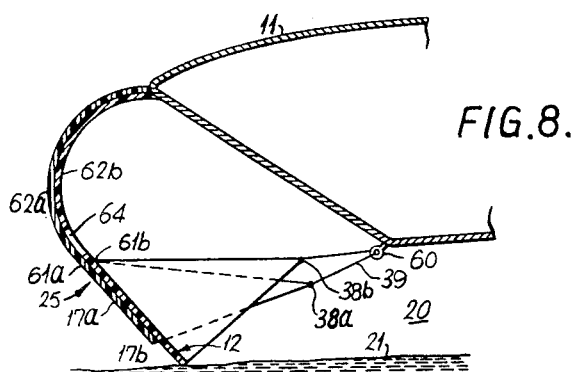
Figure 9:
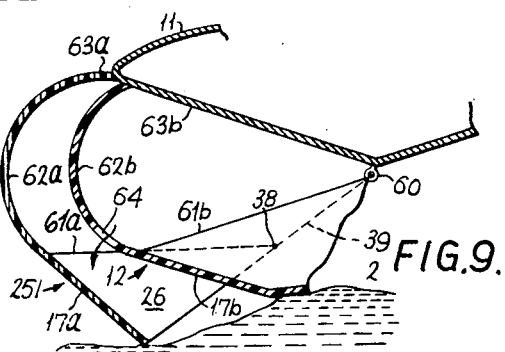
Figure 10:
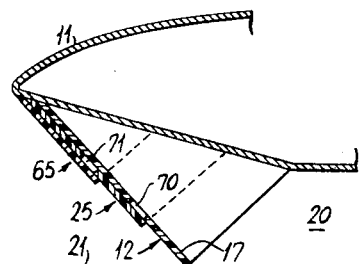
Figure 11:
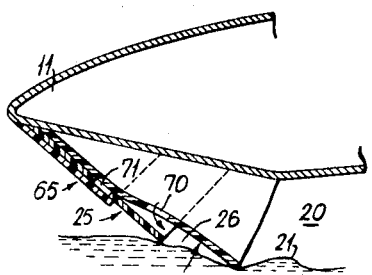
Figure 12:
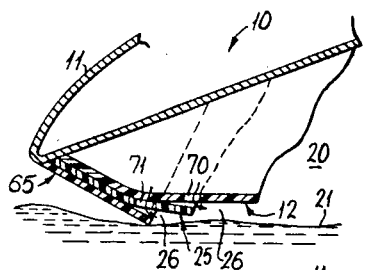
Figure 13:
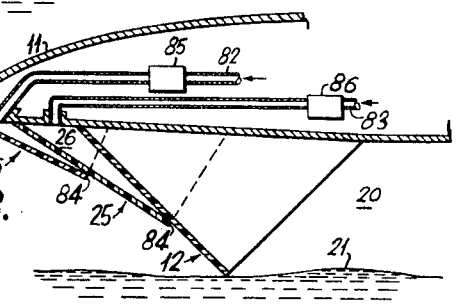
Figure 14:
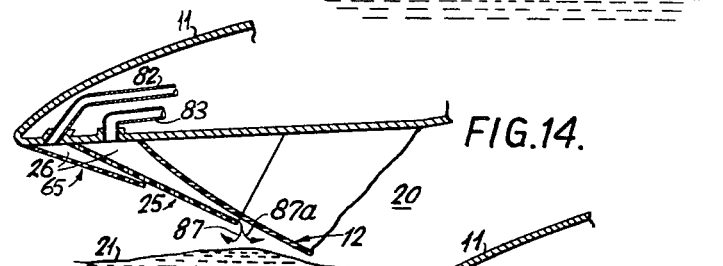
Figure 15:
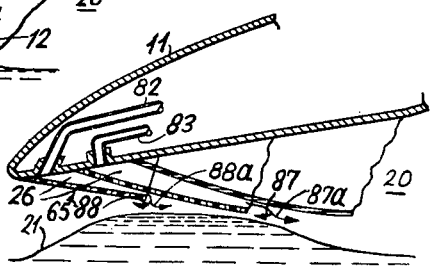

FIGURE 3 is a fragmentary side view, in section, of the vehicle of FIGURE 1 approaching a wave, FIGURES 4 and 5 are fragmentary side views, in section, illustrating two different modifications of the vehicle of FIGURE 1, FIGURE 6 is a fragmentary side view, in section, of a further modification, FIGURE 7 shows the part of the vehicle of FIGURE 6 negotiating a wave, FIGURE 8 is a fregmentary view, in section, illustrating yet another modification, FIGURE 9 shows the part of the vehicle of FIGURE 8 negotiating a wave, FIGURE 10 is a fragmentary view, in section, of a further modification of the vehicle, FIGURES 11 and 12 show the part illustrated in FIGURE 10 negotiating waves of differing heights, FIGURE 13 is a fragmentary view, in section, of another modification of the vehicle of FIGURE 1, and FIGURES 14 and 15 illustrate the modified vehicle shown in FIGURE 13 negotiating waves of differing heights.

In the drawings any item which appears in more than one figure will be given the same reference numeral in each instance.

In FIGURE 1 is shown a gas-cushion vehicle 10 of the "plenum chamber" type comprising a vehicle body 11 provided with a first or inner flexible wall or skirt 12 of air-impermeable flexible sheet material, such as rubber or proofed fabric, depending from the bottom periphery of the body 11 to contain the whole of the vehicle-supporting cushion 20. The vehicle body 11 is provided with an air-intake 13 through which air is induced by a compressor 14, driven by a motor 15, the air being discharged in a pressurised condition to below the vehicle body 11 via a duct 16. The vehicle 10 is also provided with a second or outer flexible skirt 25 of the same form as the skirt 12.

Figure 2:
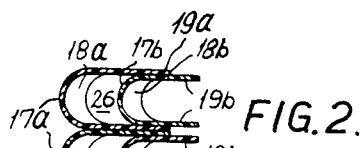
FIGURE 2 is a section taken on the lines II—II of FIGURE 1.

The skirts 12 and 25 each comprise a succession of separate wall members 17a and 17b respectively (FIGURE 2) of the form disclosed in British patent specification 1,043,351. Thus skirt 25 has a succession of independently deflectable wall members 17a each having an outer portion 18a which extends away from the vehicle body and which faces the cushion space and a pair of side portions 19a which extend inwardly from said outer portion towards said space, a side portion 19a of each wall member 17a being contiguous with the adjacent side portion 19a of a neighbouring wall member 17a, and means for constraining the wall members 17a against deflection away from said space by the pressure of gas therein, whereby inflation of said wall members by pressurised gas, which may be from said space, urges the contiguous side portions of neighbouring wall members towards each other. Similiarly skirt 12 consists of wall members 17b having outer 18b and side portions 19b. Each wall member 17b presents a concavity to the cushion space. The pressurised air discharged from the duct 16 inflates this concavity causing the side portions 19b of neighbouring wall members 17b to come into substantial sealing co-operation with each other so that pressurised air is substantially prevented from escaping between the wall members 17a. This results in formation of the air-cushion 20 which, in operation, supports the vehicle body 11 out of contact with a water surface 21 beneath the vehicle 10. The centre of pressure P of the cushion 20 is substantially below the centre of gravity c.g. of the vehicle 10 when the vehicle is in its normal attitude. Air supplied in excess of cushion maintenance requirements escapes from beneath the skirt 12.

The outer skirt 25 also depends from the body 11 and is spaced outwardly of the inner skirt 12 whereby the side portions 19b of the wall members 17b of the skirt 12 are embraced by the side portions of the wall members 17a of the skirt 25. However, the inner skirt 12 projects further below the vehicle body 11 than does the outer skirt 25. Should the projecting portion of the inner skirt 12 be deflected inwardly by contact with a surface 21, control means operate to release pressurised air into the spaces 26 defined by adjacent parts of the wall members 17a and 17b of the inner and outer skirts 25, 12 respectively. The released air then forms a region of pressurised air between the inner and outer skirts 12, 25.

The air released to the spaces 26 is supplied by the duct 16 via a branch duct 27 and a number of peripherally separated branch pipes 28, a few of which are shown in FIGURE 1. Flow through the branch pipes 28 is controlled by quick-opening, electrically-operated valves 29 which are normally closed and which are operated, in groups, through electrical signal lines (not shown) by the pilot of the vehicle 10.

The pilot controls the valves 29 as he feels the craft forward merely by throwing a switch which operates the valves 29. If the valves 29 are operated automatically some form of device responsive to nose-down attitude of the craft is required. Examples of such devices are described later in this specification.

The area of the vehicle body 11 upon which the air-cushion 20 exerts its vehicle-supporting forces lies between the vertical planes B—B through the innermost margins of opposite sides of the inner skirt 12 and during normal operation, as depicted in FIGURE 1, the cushion area is such that its centre of pressure P lies in the same vertical line as the centre of gravity.

In FIGURE 3, the vehicle 10 and the surface 21 have converged, due in this case to the vehicle 10 moving in the direction of arrow 30 towards the crest of a wave. The portion of inner skirt 12 which projects below the skirt 25 contacts the surface 21 and is upwardly deflected thereby. Contact between the skirt 12 and the surface 21 sets up a frictional drag force F acting on the bottom of the skirt 12 in a substantially horizontal direction. The drag force F acts along a line below the level of the centre of gravity c.g. (FIGURE 1) and the moment of the force F will be in an anti-clockwise sense, as viewed in FIGURE 3, causing a tendency for the vehicle 10 to turn anti-clockwise about its centre of gravity c.g. into a nose-down attitude. In the nose-down attitude contact between the skirt 12 and the surface 21 is increased and the anti-clockwise moment also increases so that the vehicle's nose-down attitude tends to worsen. There is also a possibility that the drag force F will cause the inner skirt 12 to be pulled under the vehicle body 11. The effective area of the cushion 20 now lies between the vertical planes B'–B through the innermost margins of opposite sides of the inner skirt 12 whereby the centre of the pressure P has moved rearwardly so that it is no longer in the same vertical line as the centre of gravity G of the vehicle 10. There will be a force tending to raise the rear of the vehicle 10 so that the degree of convergence between the body 11 and the surface 21 tends to be further increased. The convergence between the vehicle body 11 and the surface 21 has brought the outer skirt 25 at the front of the vehicle 10 into proximity with the surface 21. If the pilot of the vehicle now opens the valves 29, or they are automatically opened, pressurised air will be released to the spaces 26. The pressurised air trapped in the spaces 26 is laterally contained by the outer skirt 25 and produces a series of subsidiary air cushions which combine to provide a forward extension of the vehicle-supporting air-cushion 20. The subsidiary air-cushions exert a lifting force on the front of the vehicle body 11 which tends to restore the normal pitch of the vehicle 10 relative to the surface 21 in opposition to the anti-clockwise turning moment acting on the vehicle 10. When the front of the vehicle 10 is lifted relative to the surface 21 by the subsidiary cushion in spaces 26, the valves 29 are closed and the air forming the subsidiary cushion is able to escape to atmosphere. In a similar manner, subsidiary air-cushions may be formed in spaces 26 at other parts of the vehicle 10. For example, if a strong side wind should cause one side of the vehicle to tilt downwardly, subsidiary air-cushions can then be formed in the spaces 26 on that side which will tend to restore the normal operational attitude of the vehicle 10.

Air may be released, as described above, the spaces 26 at the behest of the pilot of the vehicle 10. Alternatively, air may be released to the spaces 26 automatically, for example, through sensing devices 31 (FIGURE 4) which control the valves 29 and which are operated by means responsive to the inward crumpling or drag of the inner wall structure 12 against the surface 21. One such means, diagrammatically shown in FIGURE 4, comprises a number of peripherally-spaced surface-operated elements 32, only one of which is shown, and which comprises an inclined plate 34 attached to the bottom end of a rod 33 which is urged downwardly by a compression spring 35. The rod 33 is so arranged that the sensing device 31 is operated if the rod 33 is moved upwardly by contact between the surface 21 and the plate 34.

In the modification illustrated in FIGURE 5, the sensing device 31 is operated by a tie-cord 36 extending between the lower margin 23 of each wall member 17 of the inner skirt 12 and a tension-responsive device (not shown) incorporated in a hydraulic or electric servo-switch 37. The tension-responsive device may be, for example, a rotatably-mounted drum around which the upper end of the tie-cord 3 is wound. The weight of the skirt 12 is arranged to act against the force exerted in the drum by a light return spring so that the drum is maintained by the weight of the skirt, in a datum position in which the servo-switch 37 is inactivated. If a part of the vehicle 10 should so converge with the surface 21 that a corresponding part of the inner skirt 12 tends to be dragged under the vehicle body 11, the tension in the tie-cord 36 will decrease to allow the return spring to rotate the drum thus actuating the servo-switch 37 to open the appropriate valve 31.

In the embodiment illustrated in FIGURES 6 and 7, each wall member 17a of the outer skirt 25 is normally in close contact with a wall member 17b of the inner skirt 12. The outer end of the upper margin of each side portion 19a of each member 17a of the outer skirt 25 is attached to the bottom periphery of the vehicle body 11 to 22a and the upper edges 22b of the side portions 19b of the inner wall members 17b are attached to the bottom periphery of the vehicle body 11 inwardly as far as a point 51. The point 51 is substantially at the same perpendicular distance from the innermost extremities 38b of the side portions 19b of the inner skirt 12 as the distance between the lowermost extremities 53, 54 respectively of the associated inner and outer wall members 18a and 17b. The regions of the side portions 19b of each of the inner wall members 17b inwardly of the line joining points 38 and 51 has been removed.

The innermost extremities 38a and 38b of each side portion 19a and 19b of associated inner and outer wall members 17b and 17a are interconnected by means of a tie-cord 39 extending over two longitudinally-spaced pulleys 40 rotatably-mounted under the vehicle body 11. Each inner wall member 17b is formed with an air-release aperture 41 near to its upper margin. As the area of each inner wall member 17b is greater than the area of each outer wall member 17a, the force provided by the air cushion 20 acting outwardly on the inner wall member 17b sets up a tension in each tie-cord 39 which, during normal operation, maintains the associated outer wall member 17a in contact with the inner wall member 17b, thereby closing the aperture 41, as shown in FIGURE 6. But if the vehicle 10 should converge towards the surface 21, as shown in FIGURE 7, so that the inner wall member 17b contacts the surface 21 and so tends to be dragged under the vehicle body 11, the inner extremity 38b of the side portions 19b is moved inwardly. This results in the effective area of the inner wall member 17b becoming less than the area of the outer wall member 17a, and also reduces the tension in the tie-cord 39 and allowing the co-operating inner and outer wall members 17a and 17b to separate. Air is now released from the cushion 20 via the aperture 41 to the space 26 between each pair of inner and outer wall members 17a and 17b, thus causing the separation thereof and forming a subsidiary air-cushion in the space which acts as an extension of the cushion 20. The subsidiary air-cushion compensates, at least to some extent, for the turning moment due to the skirt-surface drag force acting on the vehicle and for the movement of the centre of pressure of the vehicle-supporting cushion 20 relative to the body 11 away from the inner wall members 17b which have been dragged under the body 11.

In the arrangement of FIGURES 8 and 9 there are provided pairs of inner and outer wall members 17a and 17b respectively having their inner extremities 38a and 38b interconnected by a tie-cord 39 which is threaded through a nylon (R.T.M.) ring 60 on the vehicle body 11. The upper, outer margin of each wall member 17a, 17b is attached to the lower margin 61a, 61b respectively of membranes 62a, 62b respectively of flexible air-impermeable sheet material. The membranes 61a, 61b extend peripherally of the vehicle body 11 and are attached thereto by their upper margins at 63a and 63b. The inner membrane 62b has a cushion air-release aperture 64 immediately above its lower margin 61b and during normal operation of the vehicle the pressure of the vehicle-supporting air-cushion 20 acts on the wall members 17b and their associated membranes 62b. The air-cushion 20 is enabled to act on both the inner wall member 17b and the outer wall member 17a and their associated membranes 62a and 62b respectively by virtue of the ring 60, but because the area of each inner wall member 17b exceeds that of each outer wall member 17a, each inner wall member 17b and its membrane 62b move outwardly and, through the interconnecting tie-cord 39, draw the associated outer wall member 17a and its membrane 62a inwardly until the inner and outer wall members and their associated membranes are in close contact with each other whereby the aperture 64 in the inner membrane 62a is closed by the outer membrane 62b. If there should be drag between the flexible skirts of the vehicle and the surface over which it is progressing, as shown in FIGURE 9, the inner wall members 17b will be deflected somewhat inwardly under the body 11. The tension in the tie-cords 39 will then be reduced, allowing the outer wall members and the outer membrane 62a to move outwardly, the tie-cords 39 sliding through the nylon rings 60.

Air from the vehicle-supporting cushion 20 will then pass through the apertures 64 in the membranes 62b so that a subsidiary cushion of pressurised air is formed in the space 26 between the inner wall members 17b and the outer wall members 17a compensating for the unfavourable turning moment due to the drag between the skirt and the surface and for the rearward shift of the centre of pressure of the air-cushion 20.

The flexible skirts 12, 25 of FIGURES 8 and 9 are capable of greater upward deflection than the flexible skirts depicted in FIGURES 1 to 7, and would be employed where relatively large obstacles are likely to be encountered by the vehicle.

Although FIGURES 6 to 9 illustrate direct interconnection between the inner and outer skirts 12, 25 by means of the tie-cords 39, it is contemplated that there may instead be an interconnection through a gearbox or pulley system or other mechanical advantage means so that small inward deflections of the inner wall members 17b under the vehicle body enable relatively large outward movements of the outer wall members 17a. The sensitivity of the vehicle 10 to movements of the centre of pressure due to drag on the inner skirt 12 could thus be increased.

In the vehicle shown in FIGURES 10 to 12, three flexible skirts are provided, namely skirts 12 and 25 and a further skirt 65 of the same form. The wall members 17 of the skirt 12 project downwardly beneath those of skirt 25 which, in turn, project downwardly beneath those of the skirt 65. The wall members of each skirt are attached by their top margins to the underside of the body 11. Each wall member of the skirt 12 is provided with an air-release aperture 70 just above the region contacted by the bottom margin of a wall member of the skirt 25 and the latter wall members are each provided with an air-release aperture 71 just above the region contacted by the bottom region of the wall members of the skirt 65.

Normally, the pressure of the vehicle-supporting cushion 20 maintains the wall members of the skirts 12, 25, 65 in close contact so that substantially no pressurised air can pass through the apertures 70, 71. However, should the vehicle 10 encounter a relatively small obstruction, as shown in FIGURE 11, the skirt 12 will tend to be dragged away from the skirt 25 so as to form a subsidiary air-cushion in the space 26 between these skirts.

In FIGURE 12, the vehicle 10 has encountered a relatively larger obstruction which has deflected and dragged the wall members of the skirts 12, 25 inwardly under the vehicle body 11. Cushion air is now released through the apertures 70 and 71 so as to form subsidiary air-cushions in the spaces 26 between the wall members of the skirts. As in the previous examples, the subsidiary air-cushions act as forward extensions of the cushion 20 so as to compensate for the unfavourable turning moment and for the rearward shift of the cushion centre of pressure.

In FIGURE 13 the upper ends of the three skirts 12, 25, 65 are spaced from each other and the skirts 25 and 65 are continuously inflated by air supplied to spaces 26 through branch ducts 82, 83, connected to the duct 16. Inflation air is normally prevented from escaping from the spaces 26 by forming the wall members 17 of the skirts 25, 65 so that their bottom margins contact the outer surfaces of the wall members of the skirts 12 and 25 respectively, as shown. The wall members of the skirts 25, 65, have beadings 84 on their lower margins so as to provide a good seal with the next innermost skirt.

The branch ducts 82, 83 have blower units 85, 86 which inflate the skirts 25, 65 to above cushion pressure, the inflation pressure of the skirt 65 being above that of the skirt 25.

As will be seen from FIGURE 13, when the skirt 12 is inwardly deflected by an encounter with an obstacle on the surface beneath the vehicle, air is released from the space 26 between the skirts 12 and 25 to form a curtain 87 which assists the skirt 12 to contain the air-cushion 20 and also splits away at 87a to form a region of pressurised air between the curtain 87 and the outer surface of the inner skirt 12. This region of pressurised air tends to deflect the skirt 12 away from the surface 21 so that it is taken out of contact with the surface. Under these conditions there is no significant shift of the centre of pressure of the cushion 20.

In FIGURE 14 the vehicle has encountered an obstacle of such size that both the skirts 12 and 25 are deflected inwardly. Pressurised air is now released to flow downwardly from between the skirts 12, 25 and 65 to form air curtains 87 and 88 respectively. Portions 87a and 88a of the curtains form pressurised regions which tend to lift the skirts 12 and 25 clear of the obstacle and the curtain 88 assists these skirts in the lateral containment of the air-cushion.

We claim:

1. A gas-cushion vehicle in which the vehicle supporting cushion is contained, at least in part, by a flexible wall comprising a succession of independently deflectable flexible wall members each having an outer portion which extends away from the vehicle body and which faces the cushion space and a pair of side portions which extend inwardly from said outer portion towards said space, a side portion of each wall member being contiguous with the adjacent side portion of a neighbouring wall member, and means for constraining the wall members against deflection away from said space by the pressure of gas therein, whereby inflation of said wall members by pressurised gas urges the contiguous side portions of neighbouring wall members towards each other, the vehicle being provided with a second flexible wall, said second wall being disposed outwardly of the first wall whereby the side portions of the wall members of the first wall are embraced by the side portions of the wall members of the second wall, the first wall normally projecting further below the vehicle body than the second wall, and means operable when the projecting portion of the first wall is deflected inwardly by contact with the surface beneath the vehicle to release pressurised gas between adjacent parts of the first and second walls whereby a region of pressurised gas is formed therebetween.

2. A gas-cushion vehicle according to claim 1 and in which the second flexible wall is of the same form as the first flexible wall.

3. A gas-cushion vehicle according to claim 1 and in which the means to release the pressurised gas is in the form of valve means.

4. A gas-cushion vehicle according to claim 3 in which said valve means are operable manually.

5. A gas-cushion vehicle according to claim 3 including means for operating said valve means in response to the deflection inwardly of said first wall upon contact with said surface.

6. A gas-cushion vehicle according to claim 5 and in which said valve means are in the form of apertures in the first flexible wall, said apertures being normally closed during operation by contact with the second flexible wall but opening when the flexible walls are separated to allow a flow of pressurised gas to the space between the flexible walls.

7. A gas-cushion vehicle according to claim 5 including means interconnecting said walls in such a manner that they are held in sealing relationship until the first wall is deflected inwardly upon contact with the surface when the movement of the first wall will be conveyed to the second wall to produce the separation.

8. A gas-cushion vehicle according to claim 7 and in which said last mentioned means is a cord and pulley arrangement.

9. A gas-cushion vehicle according to claim 5 and in which said valve means are separate from the walls and include mechanical means for operating said valve means.

10. A gas-cushion vehicle according to claim 9 and in which said operating means comprises a sensing device which is moved by contact with said surface.

11. A gas-cushion vehicle according to claim 10 and in which said sensing device is a simple probe resiliently urged towards said surface so that contact with the surface causes upward movement of the probe and operates said valve means.

12. A gas-cushion vehicle according to claim 9 and in which said valve means are directly connected by said mechanical means to the first wall so that upward movement of the first wall operates said valve means.

13. A gas-cushion vehicle according to claim 12 and in which said mechanical means is a spring biassed drum round which a cord is wound so that if the cord slackens due to upward movement of the first wall the drum rotates under spring pressure to open said valve means.

14. A gas-cushion vehicle according to claim 1 and in which there is a third flexible wall located outwardly of the second wall and so arranged that if the second wall drags on the surface an additional cushion of gas is formed between the second and third flexible walls, the second flexible wall normally projecting further below the body of the vehicle than said third flexible wall.

References Cited

UNITED STATES PATENTS

| | | | |
|---|---|---|---|
| 3,424,266 | 1/1969 | Cockerell | 180—118 |
| 3,444,952 | 5/1969 | Clarke | 180—127 |

A. HARRY LEVY, Primary Examiner

U.S. Cl. X.R.

180—119, 121, 127

PO-1050
(5/69)

UNITED STATES PATENT OFFICE
CERTIFICATE OF CORRECTION

Patent No. 3,504,755          Dated April 7, 1970

Inventor(s) Denys Stanley Bliss et al.

It is certified that error appears in the above-identified patent and that said Letters Patent are hereby corrected as shown below:

Column 4, line 12, after "outer" insert --portions--; line 18, "17a" should read --17b--; line 48, after "craft" insert --pitch--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents